(12) United States Patent
Price et al.

(10) Patent No.: US 7,052,348 B2
(45) Date of Patent: May 30, 2006

(54) AUTONOMOUS BIRD PREDATION REDUCTION DEVICE

(75) Inventors: Randy R. Price, Baton Rouge, LA (US); Steven G. Hall, Baton Rouge, LA (US); Don G. Allen, Prairieville, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 120 days.

(21) Appl. No.: 10/250,973

(22) PCT Filed: Jan. 29, 2002

(86) PCT No.: PCT/US02/02433

§ 371 (c)(1),
(2), (4) Date: Aug. 2, 2004

(87) PCT Pub. No.: WO03/051709

PCT Pub. Date: Jun. 26, 2003

(65) Prior Publication Data

US 2005/0020156 A1    Jan. 27, 2005

Related U.S. Application Data

(60) Provisional application No. 60/340,511, filed on Dec. 14, 2001.

(51) Int. Cl.
*B63B 22/00* (2006.01)

(52) U.S. Cl. .................. 441/136; 119/903

(58) Field of Classification Search ............ 441/35, 441/136
See application file for complete search history.

(56) References Cited

U.S. PATENT DOCUMENTS

| 5,058,335 A | * | 10/1991 | Richter | 52/101 |
| 5,755,179 A | * | 5/1998 | Webber | 119/57.8 |
| 5,784,980 A | * | 7/1998 | Benefiel | 114/263 |

OTHER PUBLICATIONS

Bomford, M. et al., "Sonic Deterrents in Animal Damage Control: A Review of Device Test and Effectiveness," *Wildlife Society Bulletin*, vol. 18, pp. 411-422 (1990).

Hall, S. et al., "Development of an Autonomous Bird Predation Reduction Device," An ASAE Meeting Presentation, Paper No. 01-3131, pp. 1-9 (Presented Jul. 30-Aug. 1, 2001).

Hoy, M.D. et al., Eastern *Wildlife Damage Control Conference*, vol. 4, pp. 109-112 (1989).

Littauer, G.A. et al., "Control of Bird Predation at Aquaculture Facilities: Strategies and Cost Estimates," *Southern Regional Aquaculture Center*, Publ. No. 402, 5 pgs. (1997).

Stickley, A.R. et al., *Eastern Wildlife Damage Control Conference*, vol. 4, pp. 105-108 (1989).

* cited by examiner

*Primary Examiner*—Jesus D. Sotelo
(74) *Attorney, Agent, or Firm*—John H. Runnels; Bonnie J. Davis; André J. Porter

(57) ABSTRACT

A self-guided apparatus for repelling birds through various means of deterrence. The device comprises a chassis, a floatation assembly, a propulsion system, and a guidance and control system. The device may operate in either of at least two modes: passive and active. In the passive mode, the device traverses a predefined area, scaring birds away. In the active mode, the device surveys a designated area and, upon detection of birds, propels itself towards the birds and drives them away.

35 Claims, 3 Drawing Sheets

US 7,052,348 B2

AUTONOMOUS BIRD PREDATION REDUCTION DEVICE

The benefit of the 14 Dec. 2001 filing date of U.S. provisional patent application Ser. No. 60/340,511 is claimed under 35 U.S.C. § 119(e) in the United States, and is claimed under applicable treaties and conventions in all countries.

TECHNICAL FIELD

This invention pertains to a self-guided, autonomous vehicle designed to provide an inexpensive method of reducing predation of aquatic organisms by birds.

BACKGROUND ART

Bird depredation of fish, crawfish, and shrimp in aquaculture ponds poses major problems. For example, pelicans can consume 1 to 3 lb (0.45 to 1.36 kg) of fish per day, and may arrive with hundreds per flock. Cormorants, anhingas, herons, and egrets may also do significant damage to aquaculture ponds. It is estimated that one egret can eat ⅓ lb (0.15 kg) of fish per day, while a great heron can eat ⅔ to ¾ lb (0.30 to 0.34 kg) per day. See G. A. Littauer etal., "Control of Bird Predation at Aquaculture Facilities: Strategies and Cost Estimates," *Southern Regional Aquaculture Center*, Publ. No. 402 (1997). This problem can be especially troublesome in ponds that have just been stocked with young fish.

M. D. Hoy et al., *Eastern Wildlife Damage Control Conference*, vol. 4, pp. 109–112 (1989), estimated that wading birds could cause profound losses during fall migration, up to $10,000 per week on bait fish farms. The Louisiana State University Ben Hur Aquaculture Facility in Baton Rouge, La. recently experienced this problem with the white pelican during December 2000, when many fish were eaten and several ponds were completely de-stocked of fish.

A. R. Stickley et al., *Eastern Wildlife Damage Control Conference*, vol. 4, pp. 105–108 (1989), estimated that in 1988 catfish losses due to double-crested cormorants amounted to $3.3 million.

Currently, several different methods are employed to attempt to scare birds from aquaculture ponds. One of the most common methods is the use of sonic cannons. Sonic cannons emit loud bursts of noise. However, birds eventually become accustomed to the noise emitted by sonic cannons. Also, the loud "boom" produced by the sonic cannon can be disturbing to surrounding communities, and typically causes birds to migrate to other parts of the farm where the noise is more tolerable. See M. Bomford et al., "Sonic Deterrents in Animal Damage Control: A Review of Device Test and Effectiveness," *Wildlife Society Bulletin*, vol. 18, pp. 411–422 (1990).

Poisons, scarecrows, and nets have also been used. However, these methods have several faults. For example, poisons are usually fatal to birds and may cause casualties in non-target species. Scarecrows are effective for short-term periods only, because birds typically adapt and become accustomed to them. Nets typically have a high initial cost and are not practical for large ponds (>5 acres/~2 hectares).

An unfilled need exists for a cost-effective device and method for effectively reducing bird predation of aquatic organisms over a relatively long period of time. The device should be environmentally friendly, harmless to birds, and capable of withstanding expected environmental elements (e.g., water, wind, sun, and rain) and animal attacks. The device should also be able to endure biological challenges (e.g., wind, weeds, and slime), and should have some level of intelligence to adapt to the evolving conduct of birds.

DISCLOSURE OF INVENTION

We have discovered a reliable and inexpensive device and method for repelling birds through various means of deterrence. The device may be adapted to reduce predation by various bird species, and to operate in different environments. The predation reduction device comprises a chassis, a floatation assembly, a propulsion system, and a guidance and control system. The device may operate in either of at least two modes: passive and active. In the passive mode, the device traverses a predefined area, scaring birds away. In the active mode, the device traverses a surveyed area and, upon detection of birds, propels itself towards the birds and drives them away.

Unlike prior devices and methods of reducing bird predation (e.g., poisons, nets, remote control devices, etc.), the novel device is self-guided and employs harassing and intimidating tactics to repel predatory birds. Optionally, a deterrent system (e.g., non-destructive water cannon, scarecrow-type or other disguise, offensive-colored dressing, etc.) is employed to assist in harassing and intimidating the birds.

MODES FOR CARRYING OUT THE INVENTION

Figure 1:
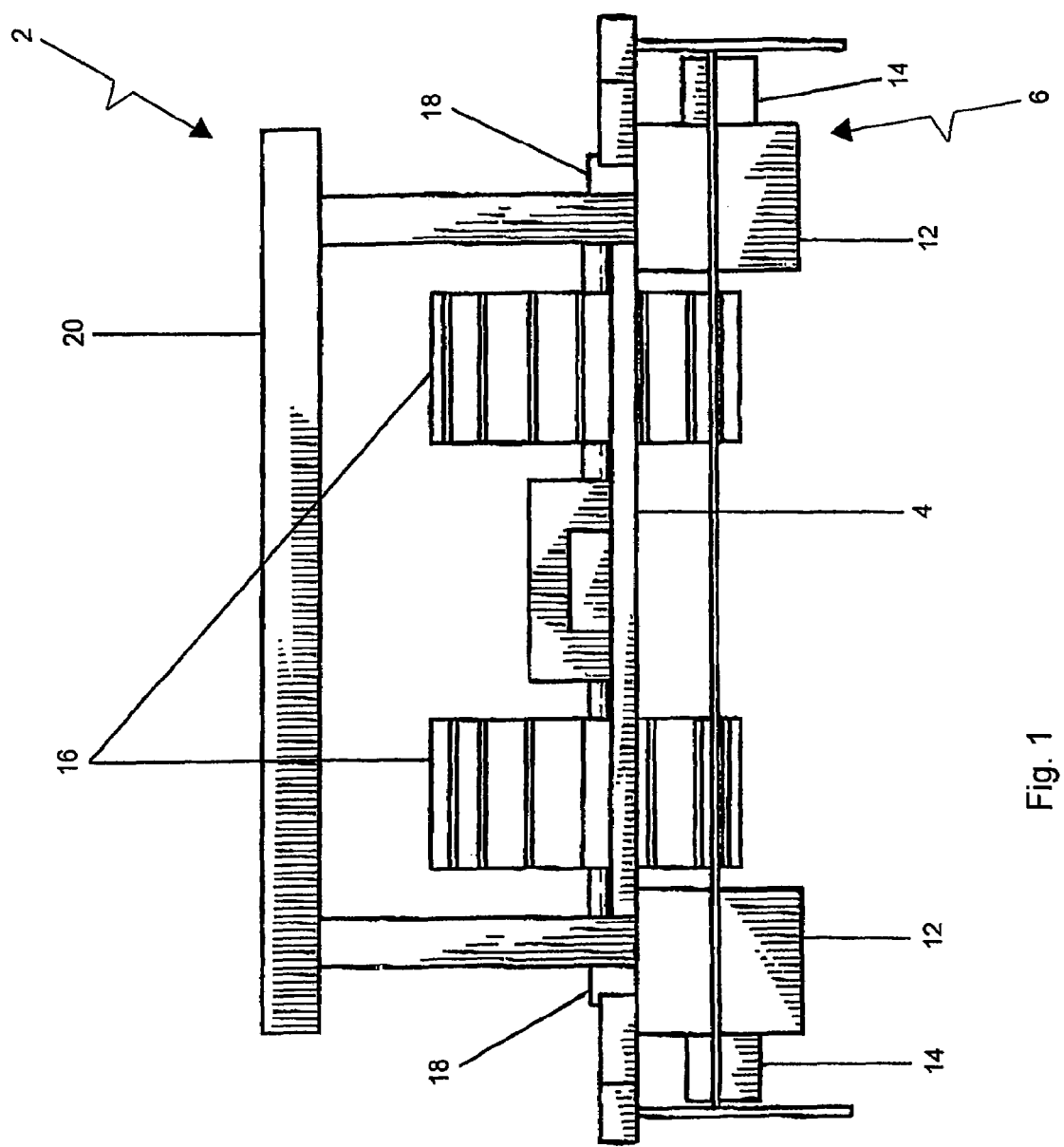
FIG. 1 illustrates a front plan view of one embodiment of the predation reduction device.

In the early stages of developing the present invention (unpublished work), a radio-controlled hobby boat (single-propeller drive source and battery-powered) was adapted to operate as a bird predation reduction device. However, several problems were encountered. First, the boat was unable to operate in an autonomous, self-guided manner. While the boat was able to reach places that humans could not, continuous human control was necessary. Second, battery life tended to be less than half an hour, which was insufficient because bird predation typically occurs over an extended time period (an entire day). Third, the propeller easily became entangled in weeds, which caused the boat to either slow or stop, and which increased the propeller's susceptibility to mechanical failure. Fourth, the boat chassis was not designed to carry additional equipment. Some of these problems were addressed by adding a large Styrofoam® (Dow Chemical Company, Midland, Mich.) platform to the boat chassis; however, the boat then became difficult to control.

In one embodiment, this invention provides a self-guided, autonomous device for driving birds away from a selected area. The basic design comprises a chassis, a floatation assembly, a propulsion system, and a guidance and control system. The predation reduction device is preferably solar powered and controlled by micro-controllers. The predation reduction device preferably operates in either or both of at least two modes: active and passive. In the active mode, the micro-controllers communicate and function in conformity with a navigation system (e.g., machine vision system, global positioning system, sonar, etc.) and a collision prevention system to autonomously navigate the device around ponds and other waterways, either continuously or upon detection of birds. When operating in the passive mode, the predation reduction device employs the collision prevention system only, allowing the device to move in a pre-determined pattern, or to perform a "random walk" type movement around a specified area. Upon making contact with an obstacle (e.g., shoreline, etc.), the device stops, backs up, rotates between 0° to 360°, and then proceeds forward again. Alternatively, the device can be programmed to traverse a pre-determined pattern.

This device has several advantages. First, costs are reduced compared to other predation reduction methods. The predation reduction device is virtually self-sufficient, and thus reduces the need for human intervention. Second, the predation reduction device is less harmful to birds than many existing techniques because it employs harassing and intimidating tactics to drive birds away, instead of poisons or devices that are potentially lethal to birds. Third, the predation reduction device is energy-efficient and environmentally friendly. The device preferably relies on solar power. Fourth, the device can operate extremely quietly. Thus, the device may be employed at various locations, including aquaculture ponds located near residential areas. The device could save as much as hundreds of thousands of dollars per year for farmers by reducing bird predation and environmental impacts.

FIG. 1 illustrates a front plan view of one embodiment of the predation reduction device 2. This embodiment comprised a chassis 4, a floatation assembly 6, a propulsion system, and a guidance and control system. Optionally, a deterrent system (e.g., non-destructive water cannon, scarecrow-type or other disguise, offensive-colored dressing, lights, sounds, etc.) can be added to the predation reduction device 2 to assist in harassing bird (not shown).

The floatation assembly 6 comprised two fixed floats 12 and two movable floats 14. Fixed floats 12 were permanently mounted to chassis 4 on opposite sides of the predation reduction device 2 to provide buoyancy. Each fixed float 12 was enclosed in a casing to prevent damage from floating debris (e.g., sticks, weeds, etc.). Movable floats 14 were adjustably attached to the sides of fixed floats 12 to balance the predation reduction device 2 while in water. (The movable floats 14 were slid forward or backward along the sides of the fixed floats 12 to balance the predation reduction device 2 as equipment was added or removed.) Both fixed and moveable floats, 12 and 14 respectively, were made from a lightweight, buoyant material adapted to resist environmental degradation (e.g., degradation caused by sun, water, and bacteria) while providing sufficient buoyancy to keep predation reduction device 2 afloat, such as Styrofoam® (Dow Chemical Company, Midland, Mich.).

The propulsion system comprised a drive source and a motive source. In this embodiment, the drive source comprised two paddle wheels 16. Paddle wheels 16 were chosen because of their ability to traverse shallow water filled with debris, while allowing drive source placement above the water line. (Paddle wheels 16 avoided entanglement with debris because the mechanical drive was located above the water line and the rotational speed was slower than propeller-type drive systems.) Paddle wheels 16 provided operational speeds up to 7 mph (~11 km/h), which was sufficient to discourage birds, and which incidentally caused additional aeration in the water. Paddle wheels 16 were individually mounted to chassis 4 and centrally positioned between fixed floats 12 at a height sufficient to allow paddle wheels 16 to propel the predation reduction device 2. (Paddle wheels 16 were mounted between fixed floats 12 to avoid unnecessary contact with debris. Fixed floats 12 were adapted to allow approximately 1.5 in (~3.80 cm) of the surface area of each paddle wheel 16 into the water.) Each paddle wheel 16 independently rotated forward and backward, providing a means for the predation reduction device 2 to be maneuvered to almost any position. For example, to propel the predation reduction device 2 forward or backward, paddle wheels 16 were rotated evenly in the same direction. To change the direction in which the predation reduction device 2 was traveling, paddle wheels 16 were rotated in opposite directions.

Each paddle wheel 16 was driven by a motive source capable of providing torque and shaft speed sufficient to accelerate and propel the predation reduction device 2 effectively, such as a Pittman® electric motor, model GM712-31 (Harleysville, Pa.). Electric motors 18 were operated by an electric power source. Electric motors 18 were mounted a safe distance from the water surface and adapted to be attached to paddle wheels 16. Electric motors 18 were chosen for ease of maintenance and the ability to be recharged in an environmentally friendly manner (e.g., solar power).

In this embodiment, the electric power source comprised solar power panels 20 mounted on top of the predation reduction device 2. Solar power panels 20 provided a means for energizing electrical systems, and also provided overhead cover for the guidance and control system. Solar power panels 20 provided sufficient power to energize the propulsion system and guidance and control system during daytime operations, and sufficient power to charge batteries for limited nighttime operations.

Figure 2:
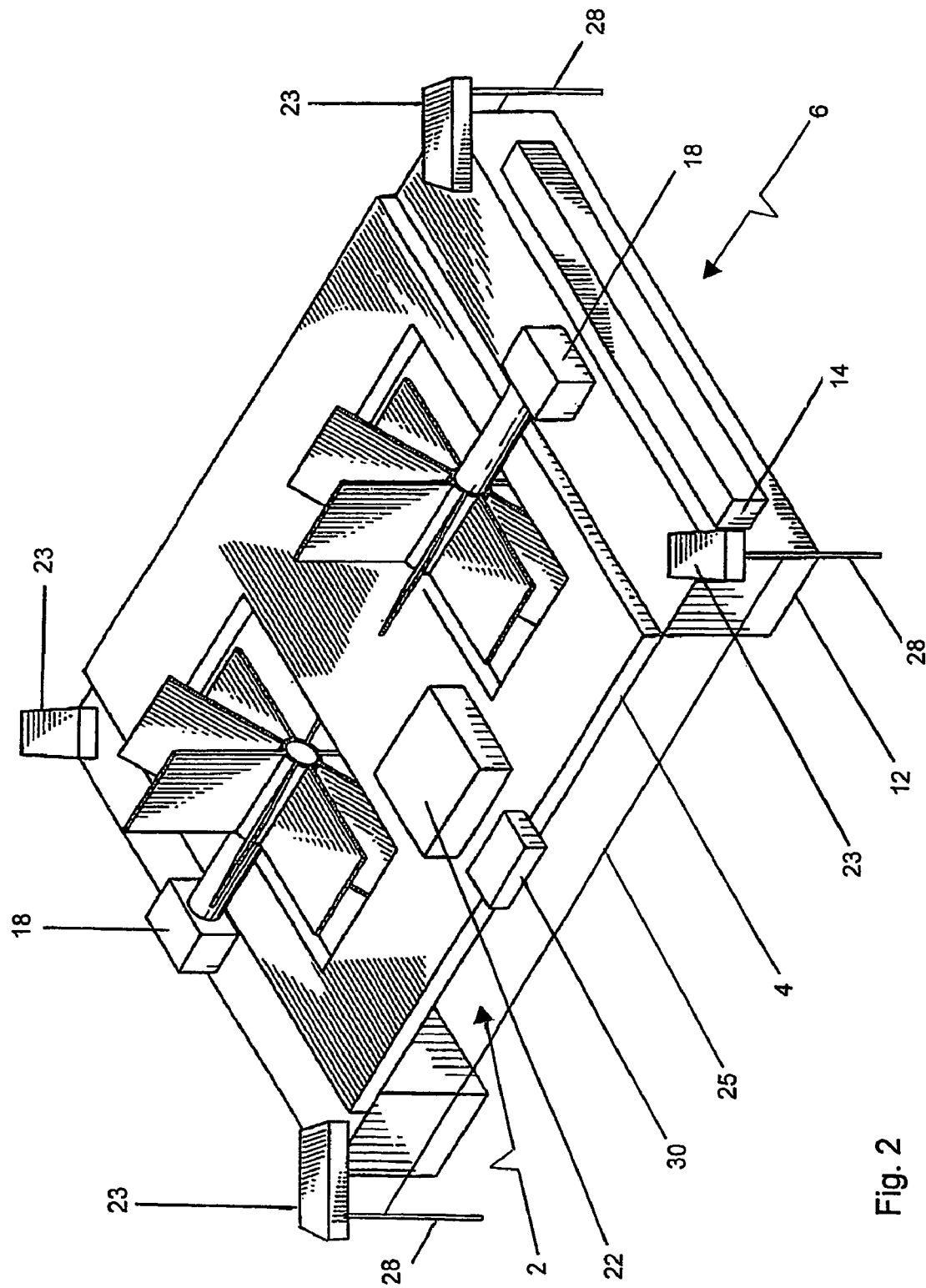
FIG. 2 illustrates a perspective view of one embodiment of the predation reduction device with the solar panels removed.

FIG. 2 illustrates a perspective view of one embodiment of the predation reduction device. In this embodiment, the guidance and control system comprised an electronic system 22, a collision prevention system, and a navigation system. In this embodiment, the electronic system 22 further comprised a micro-controller system (not shown) having motor controllers capable of supporting program languages and of communicating with the navigation system, such as Lego® Robotic Control X systems (RCX) (Lego Systems, Enfield, Conn.), or Basic II Stamp semiconductor chips (Parallax, Inc., Rocklin, Calif.). The micro-controller system operated by processing guidance information received from either a collision prevention system (mechanical proximity feelers, optical, image, sonar, radar, doppler radar shoreline indicators, etc.) or a navigation system (machine vision, global positioning, local area navigation, etc.), or both. The micro-controller system independently controlled each electric motor 18 by using the guidance information to determine the direction and action needed by the paddle wheels to move the boat. The micro-controller system sent signals to the motor-controllers to actuate electric motors 18. (Motor controllers are not always necessary for operation of the vehicle. In some instances, relays or similar devices can be employed instead.) Programming in software supplied by the micro-controller manufacturer provided a means for the motor controllers to communicate with the navigation system, and to apply variable power to electric motors 18.

A collision prevention system was used to prevent the predation reduction device 2 from colliding with obstacles. In one embodiment, the collision prevention system comprised four, ⅜ inch (~0.9 cm) diameter fiberglass poles (proximity feelers) 28, each mounted on a corner of the predation reduction device 2 and connected to triggering mechanisms 23 operable in moist environments, such as sealed mechanical magnetic switches, Radio Shack Cat. No. 49-497 (Tandy Corporation, Fort Worth, Tex.). The collision prevention system communicated with the electronic system 22, and provided a means to operate the predation reduction device 2 in a passive mode. The collision prevention system also prevented the occurrence of collisions when operating the predation reduction device 2 in an active mode. Optionally, a string 25 or wire can be attached between proximity feelers 28, thereby forming a detection zone capable of detecting objects, such as the shoreline, drain pipes, and rocks. Also, a position-indicating system, such as global positioning system, Model "310" or "330" (Magellan Corporation, San Dimas, Calif.), may be employed to track or control the movement of the predation reduction device 2. (not shown)

In one embodiment, to facilitate the identification and pursuit of birds, the navigation system employed a machine vision system 30, such as Lego® Mindstorms Vision Command (Lego Systems, Enfield, Conn.). Data from machine vision system 30 was transmitted to a data processing system (not shown) removably mounted underneath solar power panels 20 (not shown) to facilitate an active functional mode, such as a Compaq® Presario® laptop computer, model 275-0005A (Compaq, Houston, Tex.). (The solar power panels 20 also provided overhead cover for the data processing system.) The data processing system processed data gathered by machine vision system 30. Optionally, a deterrent system (e.g., non-destructive water cannon, a rotating laser system, etc.) can be employed to harass and intimidate birds once detected. The rotating laser system scares away birds by creating a moving beam (e.g., line, dot, or strip) on the shore, or on an object sticking out of the water, startling birds as it passes. The laser power range is adapted to avoid adversely affecting the sight of birds. The rotating beam creates a light burst that startles birds and other animals observing the predation reduction device 2.

Figure 3:
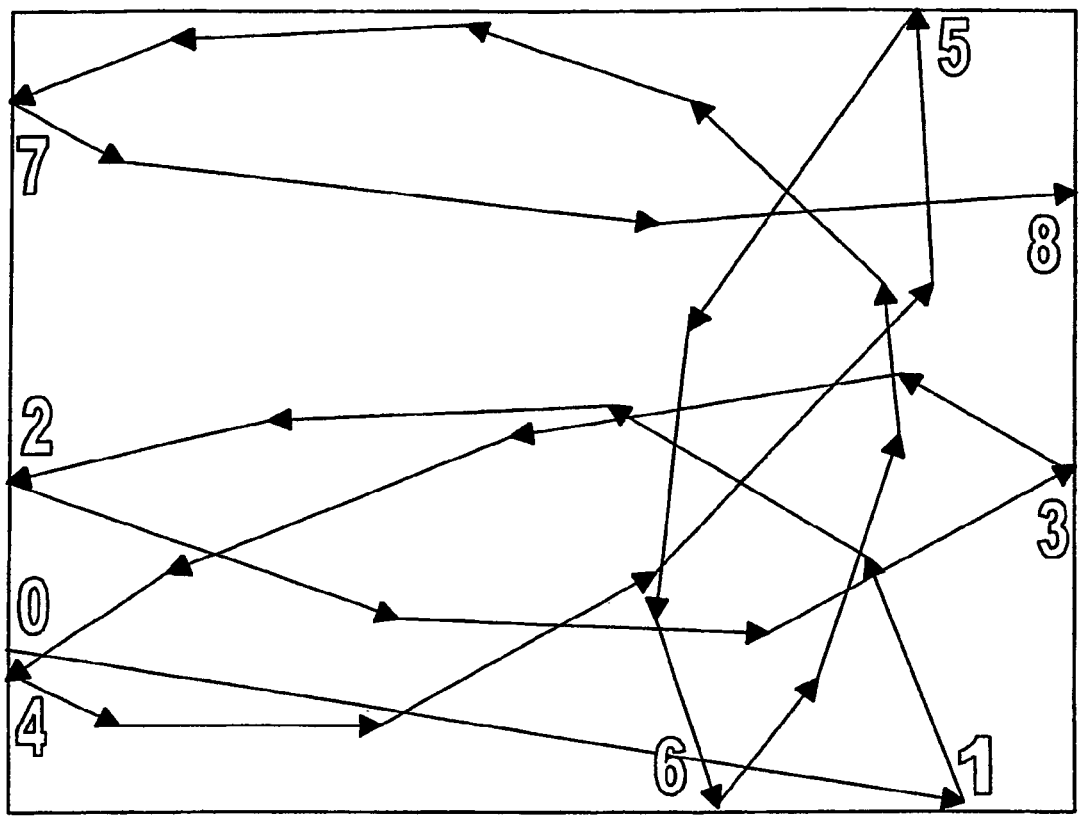
FIG. 3 is an illustrative trajectory diagram depicting typical paths traversed by one embodiment of the predation reduction device.

FIG. 3 is a trajectory diagram depicting typical paths traversed by one embodiment of the predation reduction device 2. In this embodiment, the predation reduction device 2, operating in passive mode, employed proximity sensors 28 and triggering mechanisms 23 to perform "random walk-type" movements around a pond. Upon detecting the shoreline, the predation reduction device 2 backed away from the shoreline, rotated between 0° to 360°, and headed in a different direction.

EXAMPLE 1

Construction of the Prototype

The chassis 4 was made from aluminum sheet metal and bar stock. The fixed and moveable floats, 12 and 14, respectively, were fabricated from Styrofoam®, and protected from mechanical damage by 16-gauge aluminum. The chassis 4 contained two fixed floats 12 (volume=660 in$^3$ (~10.8 L)) and two moveable floats 14 (volume=315 in$^3$ (~5.2 L)) attached to the side of each fixed float 12 to provide additional buoyancy and balance. The chassis 4 provided approximately 50 lb (~16 kg) total buoyancy. The total weight of the predation reduction device 2 was between 30–40 lb (~13–18 kg), depending upon the embodiment being operated.

Paddle wheels 16 were constructed from riveted sheet aluminum. Paddle wheels 16 were mounted on each side of the predation reduction device 2 and attached to two 12V Pittman®, Model GM712–31, electric motors 18. Electric motors 18 were connected to paddle wheels 16 by a gear drive with a 1:16 gear ratio, which allowed electric motors 18 to be positioned above fixed floats 12 at a safe distance from the water surface.

After determining that electric motors 18 required approximately 0.3 A each, during both forward and backward movement, and about 0.6 A each during directional changes, three solar power panels 20, Model SKU#41144, (LY, Inc., China) (single amorphous silicon cell solar power panels, 12 V dc, 350 mA, 5 Watt), were mounted above paddle wheels 16; these panels also sheltered the data processing system directly underneath. Solar power panels 20 provided 1.3 amperes at 12 V dc in bright sunlight, which provided enough energy to operate the predation reduction device 2 and to charge the batteries. (An additional solar panel was later added to increase the total current to approximately 1.8 amps at 12 V dc, in direct sunlight.) Two 12 V batteries (Elks®, Model 1245, 12 V dc, 5.0 Ah) were used to store power for limited nighttime operations.

In one embodiment, the electronic system 22 comprised a single chip micro-controller. Two different micro-controllers were used during initial testing. The first micro-controller was a Lego® Mindstorms RCX. The Mindstorms RCX micro-controller contained three built-in motor controllers (0.5 A each at 9 V dc) and three digital (or switch) inputs. A 9 V regulator was used to power the micro-controller from the 12 V dc batteries. The second micro-controller was a Basic II Stamp semiconductor chip. This chip had 2K bytes of electrical memory, a 20 Hz clock rate (4000 instructions per second), and 16 input/output lines. An H-bridge relay system and motor controllers were operated with the Mindstorms RCX micro-controller to control the paddle wheel motors (since the Mindstorms RCX micro-controller was 9 V dc and main batteries were 12 V dc). The relays used in the H-bridge were Radio Shack Model 275-0005A. Solutions Cubed, Motor Mind B motor controllers were employed with the Basic II Stamp semiconductor chip to operate the paddle wheels 16. This arrangement allowed speed control of electric motors 18 using serial transmissions from the Basis II Stamp micro-controller to the Solutions Cubed, Motor Mind B motor controller, which used pulse width modulation. (Basic II Stamp semiconductor chips have the advantage of applying variable rate power to electric motors 18, using serial transmissions from the Basic II Stamp semiconductor chip and Pulse Width Modulation.) These chips were rated at 2 A continuous current output, with a built-in heat sink. All electronics were protected from the environment using Tupperware® containers or Ziplock®bags. The Mindstorms RCX micro-controller and the Basic Stamp II controller were used to control separately the direction and movement of electric motors 18 for steering and propulsion of the predation reduction device 2. By contrast, when the Vision Command was used, the Mindstorms RCX micro-controller relayed steering commands from the Vision Command software and the Compaq® Presario® laptop computer to the Basic Stamp Controller (which controlled the paddle wheel motors). The Basic Stamp II controller used computer language, basic algorithms and special subroutines to control motor direction and speed when either the proximity feelers 28 were actuated, or when steering commands were sent from the Mindstorms RCX micro-controller and the Vision Command. These routines included special "slow spin-down to a stop" and "slow spin-up from a stop" functions to reduce mechanical wear (i.e., a kind of electronic clutch). In cases where the Mindstorms RCX was used, the same commands were developed using object oriented programming language for the Lego® systems.

The collision prevention system was employed to prevent collisions with objects. In facilitate this system, ⅜ inch (~0.9 cm) diameter fiberglass poles (proximity feelers 28) from a mobile TV antenna, Radio Shack Cat. No. 15-1609 (Tandy Corporation, Fort Worth, Tex.), were mounted on each corner, using either a specially bent 4 inch to 6 inch (~10 cm to 15 cm) standard light tee hinge (National, Sterling, Ill.), which triggered the Radio Shack Cat. No. 49-497 (Tandy Corporation, Fort Worth, Tex.) magnetic switches upon collision with the shore, or another object having sufficient inertia. (Magnetic switches 23 were employed because they were sealed and completely waterproof.) A string 25 was run between proximity feelers 28 to detect objects such as drain pipes and rocks. A handheld, waterproof global positioning system (Magellan Corporation Model "310" or "330") was also added to provide positional information. This system transferred data with the micro-controller through a serial cable using standard NEMA (National Marine Electronics Association) 0183 code. (This system was not used with the Lego® Mindstorms RCX, because serial transmission inputs were not available for it.)

EXAMPLE 2

Predation Reduction Tests

To confirm that the prototype predation reduction device 2 was effective in repelling predatory birds, tests were conducted using various navigation methods. In one embodiment, a navigation method used proximity feelers 28 to detect the shoreline and then turn the predation reduction device 2. Using this method, the device 2 performed a "random walk" type movement around the pond as the shoreline was encountered. The predation reduction device 2 backed up for 6 seconds to move away from the shoreline, and then turned for 6 seconds to perform a 0° to 360° turn. (Micro-controllers, software and either relays or transistor drivers were adapted and employed to accomplish this "random walk-type" movement.) These functions (i.e., traversing the pond, backing up, and turning) also scared the birds away from the pond and the shoreline. Initial testing was conducted at the Louisiana State University Ben Hur Aquaculture Center in Baton Rouge, La.

Another navigation method comprised a global positioning system and programming algorithms to follow coordinates programmed into the global positioning system. Another navigation method employed machine vision system 30 to identify birds. Data from machine vision system 30 was transmitted to the data processing system. The data processing system used a pre-determined grid pattern that divided the image of the pond into sections, and then trained each section to sense light, motion, or color to detect birds. (The image of the pond was photographed by a camera mounted to chassis 4, on the front side of the predation reduction device 2). Motion was detected by comparing subsequent frames from the camera (30 images/sec) to detect differences, such as new occurrences of birds in the frames. Color was detected by "training" the data processing system to recognize the color of a bird (from either a model of the bird or a captured image of a real bird), and then training the data processing system to scan subsequent frames for detection of the color in a certain percentage of the image area (a percentage that could be adjusted). Brightness can also be used to find birds, especially if an infrared camera is employed to acquire images. This approach is especially suitable for work at night. These detection methods can be used separately or they may be combined to detect birds. Image detection was programmed using the Lego® Mindstorms Vision Command system, which contains an object oriented programming language for detection schemes such as these. Navigation routines were also programmed into the Basic II Stamp semiconductor chip to control turning towards the detected birds. Turning data was transmitted to the Basic Stamp II micro-controller using a 5 volt regulator chip, connected between the motor driver output ports of the Lego® Mindstorms RCX.and the micro-controller input pins. Software routines were programmed into the Basic II Stamp chip to control turning towards birds detected in different parts of the image. In addition, a windshield washer (Model P50, Poberk, Brownsville, Tex.) was attached to the Lego® Mindstorms Vision Command system using a 9V dc, single pole, double throw relay, Radio Shack Cat. No. 275-005A (Tandy Corporation, Fort Worth, Tex.) to squirt water at a bird (in front of the device 2) when the machine vision system 30 indicated the bird was in the center of the image, approximately 10 to 20 feet away. (This distance can be increased with higher pressure/flow rate water streams and improved image processing equipment). Currently, the water cannon in the prototype delivers a stream of water at 0.25 liters/sec. In some instances, the system also squirted birds on the shore. These operations allowed the predation reduction device 2 to detect, turn, and chase and harass birds.

The global positioning system and the Basic II Stamp semiconductor chip have also been programmed to create an imaginary boundary diagram of the pond. However, at the time this application was filed, the "imaginary boundary" system had not yet been tested. It is envisioned that this system would create a box or other shaped area in which the predation reduction device 2 would operate using global positioning system coordinates. When the predation reduction device 2 nears the boundary of the preset area (indicated by the global positioning system coordinates), it would change directions, based on either the random direction algorithm of the predation reduction device 2 or a magnetic compass. This system could be employed when multiple boats are used to patrol separate areas of a large pond.

Also, adual stageDoppler radar sensor (Bulldog Security Inc., Wintersville, Ohio) was tested to detect birds close to the predation reduction device 2. This system could be employed to detect objects located near (within 4–5 ft (~1.2–1.5 m)) of the predation reduction device 2. This system was also able to detect the shoreline and other objects of sufficient mass. Passive infrared sensors are currently being tested to detect birds as well.

The "characteristic distance" is defined to be the typical or average distance within which the predation reduction device must approach a bird in order to cause the bird to leave the vicinity of the device. The "characteristic distance" may vary by type of bird, time of day, time of year, weather, hunger or other physical state of the bird, the characteristics of the particular device (e.g., presence of water cannon, color, alligator or other predator-like disguise, etc.), and the bird's degree of familiarity with the device or similar devices. The characteristic distance in prototype tests has typically been on the order of 10 to 30 ft (~3 to 9 m).

EXAMPLE 3

Alternative Embodiment

In an alternative embodiment, a docking station (not shown) can be employed to automatically recharge the batteries on the predation reduction device 2. Optionally, batteries with a low charge may be replaced with fully charged batteries. In this embodiment, the docking station comprises a hub platform and output terminal posts. The hub platform has V-shaped guides which extend outwardly to engage the predation reduction device 2. (The docking station can be positioned on the water or moored to the shore-line.)

Once a low battery level is detected, the navigation system processes guidance information received from either the collision prevention system (e.g., mechanical proximity feelers, sensory bumper guards, etc.) or the navigation system (machine vision system, differential global positioning system, etc.) to locate and engage the docking station. The machine vision system may be programmed to detect a homing signal (e.g., blinking light) mounted on the docking station. When using the differential global positioning system, the navigation system is provided real time positioning information to locate the docking station. An input terminal post capable of receiving externally provided power and distributing power to the batteries is mounted in front of the predation reduction device 2.

Once the predation reduction device 2 locates the docking station, the paddle wheels 16 propel it towards the docking station. Upon engagement, the V-shaped guides lead the predation reduction device 2 to a position where the input terminal post contacts one of the output terminal posts, allowing 12V DC, 110V AC, or 220V AC to be used to recharge the batteries. (Electrical power maybe provided to the docking station by several means, including batteries and a solar power array, an electrical cable connected to an electrical outlet located on the shore, or a gasoline powered electrical generator.) If the predation reduction device 2 initially fails to engage the V-shaped docking port, the collision prevention system (e.g., mechanical proximity feelers, sensory bumper guards, etc.) causes the boat to back up and try again.

When charging is completed, a signal is transmitted to the micro-controller system reversing the propulsion of the predation reduction device 2 until it completely disengages from the docking station. The predation reduction device 2 then performs its previous functions until another recharging is needed.

RESULTS

Reduction in Bird Predation

Aquatic predatory birds were not present in large numbers during initial testing, but limited testing was performed on occasional birds (e.g., herons, egrets, geese, and cormorants) that landed in protected ponds. During these tests, birds, were either driven away from the pond or did not fly onto the pond in which the device was located. During one test, an egret watched the predation reduction device 2, and then flew away when the predation reduction device 2 made a turning maneuver near it. In another test, the predation reduction device 2 was placed on a pond and allowed to operate all day. A flock of geese that had usually frequented the pond did not visit the pond while the predation reduction device 2 was present. The birds seemed "hazed" by the predation reduction device 2. Additional tests were conducted on egrets and cormorants, during times of peak bird predation. These tests involved putting up to 2 boats on the surface of a 1 acre pond (~0.4 hectares) stocked with catfish fingerlings and recording the bird populations with a time-lapse recorder. These tests were run for three days with a boat on the pond, and then three days without a boat. Replications were done for several months between November and December of 2001. Review of the recordings indicated that the boat reduced bird populations by approximately 75%, and in some instances up to 100%.

The machine vision system 30 did encounter some initial problems. The system worked well in the laboratory, but had a brightness problem with the intense sunlight found outside; however, the brightness problem may be solved by using a tinted lens, a different camera, or adjusting the camera software. Also, the machine vision system seemed to have problems calibrating to white colors, including sun glare, which appears to be a problem inherent to the Lego® Vision Command software. These problems can be solved by adding software routines to provide a more positive identification of the birds using fuzzy logic, neural networks, maximum likelihood classifier routines and multiple pieces of information from the image or other sensors, such as color, shape, and heat signature combined.

Deterrence System

Testing of the non-destructive water cannon was effective in scaring birds, but in preliminary tests the predation reduction device 2 was never in close enough proximity to actually spray a bird. Lasers are being investigated for longer range "scaring" of birds.

Electrical Power Source

The solar power panels 20 worked effectively throughout the day, providing enough energy to operate the predation reduction device 2. Measurements indicated that the predation reduction device 2 consumed approximately 0.6 to 0.8 A, while solar power panels 20 produced over 1.5 A on sunny days. In cloudy conditions, solar power panels 20 supplied enough power to maintain traversing operations for a reduced time (4–6 hours). Nighttime testing has not yet been performed, but it is believed that the prototype predation reduction device 2 will run at least several hours on stored battery power. A future version of the predation reduction device 2 may include batteries with greater storing capacity.

Guidance and Control System

The collision prevention system proved to be essentially 100% effective. The system allowed the predation reduction device 2 to back up and rotate between 0° to 360°. Proximity feelers 28 and mechanical magnetic sensors 23 provided a means for the predation reduction device 2 to randomly traverse essentially the whole pond. During initial testing, the predation reduction device 2 traversed the entire surface area (i.e., within about 20 ft (~6.1 m) of 90% of the pond surface) of a 1.5 acre (~0.6 hectares) pond, with 2 to 5 mph (~3 to 8 km/h) winds, in about 30 minutes. In addition, during a long duration test, the boat effectively "lived" on the pond without getting caught or snagging on an object. The device can be protected from aerators by placing a protective device around the aerators, such as an anchored plastic tubing ring that sits approximately 1 ft (~0.3 m) below the surface.

Paddle wheels 16 effectively propelled the predation reduction device 2 at a high speed (5 mph) (~8 km/h), while maintaining low power draw from electrical motors 18. Also, paddle wheels 16 were not jammed or clogged with weeds. (The predation reduction device 2 has not to date been tested in water containing high trash volumes.) Paddle wheel 16 speeds were slow, and water friction was kept to a minimum.

Some problems were initially encountered with the gear drive. The Lego® Mindstorms RCX micro-controller and H-relays (which had a sudden "on/off" effect) caused excessive wear in the gear drive and excessive shock loading on shafts and set screws during directional changes. This problem was eliminated by using the Basic II Stamp micro-controller, which was programmed to ramp down the motor speed before a directional change, an effect that could also be implemented in the Lego® RCX programming, i.e., a type of electronic clutch.

In some instances, winds in excess of 10 mph (~16 km/h) caused the predation reduction device 2 to drift, even while power was applied. Several design parameters were changed to reduce wind effects. First, the boat was streamlined. Solar power panels 20 were placed horizontally to reduce wind effects. Floats 12 and 14 were trimmed in size to lower the floatation level of the predation reduction device 2, minimizing the surface area of floats 12 and 14 above the surface of the water. A rudder was added to aid in maintaining direction during windy periods. (not shown)

The Lego® RCX micro-controller contained a limited number of input/output lines when used with the machine vision system 30, but it still effectively controlled the propulsion system, including the proximity feelers 28 and the navigation system. The Basic II Stamp semiconductor chip appeared more reliable than the Lego® Mindstorms RCX micro-controller.

The global positioning system was accurate to within about 5 to 6 ft (~1.5 to 1.8 m); however, in some situations, positioning measurements deviated as much as 30 ft (~9 km/h)(with selective availability turned off). This error is not critical in a large pond (>5 acres/~2 hectares), but could cause some problems in a small pond (<1 acre/~0.4 hectares). For this reason, the proximity feeler system and the "random walk" type methods were solely used for navigation. In the future, the global positioning system may be used to guide the predation reduction device 2 between different ponds using, for example, an amphibious-design vehicle capable of traversing land and water through the use of multiple paddle wheels 16.

Future testing will explore the interaction between birds and their environment. Birds quickly adapt to "standard" signals, such as the regular movement of equipment or even of other animals. Sudden movements, such as changes in direction or rotation of the predation reduction device 2, seem to startle birds. Active deterrence systems, such as lasers or non-destructive water cannons, seem to reinforce bird intimidation. The addition of highly visible patterns (e.g., large eyes, alligator silhouettes, etc.) may also aid in improving the effectiveness of the deterrence system.

It is believed that this device or similar devices could be used for other in-field environmental and biological engineering applications. Possible uses include remote measurement of water quality parameters, crop scouting, site-specific environmental monitoring for various crops, pest predation reduction applications, and possibly crop harvest. Similar systems might be used in wild ecosystems to monitor environmental quality. The addition of a radio modem system to allow data to be sent back to a field station is another future development.

Future embodiments of the predation reduction device 2 will include the following: (1) an improved frame design (e.g., a frame built of either plastic, wood or other floatation materials), and mechanical components that generate more power which would allow the predation reduction device 2 to be propelled faster; (2) an improved machine vision system 30 will employ classifier schemes that will help recognize birds using faster algorithms and a combination of information input sources (e.g., color, object size and texture, heat, etc.) to better identify birds; (3) either a swivel drive (U-joint, etc.) or a direct drive coupling to connect electric motors 18 to paddle wheels 16; (4) a differentially-corrected global positioning system may be used to obtain more accurate readings (although not necessary in the current embodiment); (5) multiple paddle wheels 18 capable of traversing levees may be added to the predation reduction device 2 to allow it to move between ponds; and (5) a docking station capable of recharging batteries on the predation reduction device 2, to allow all-night operations and faster speeds if solar panels 20 were removed or reduced.

The complete disclosures of all references cited in this specification are hereby incorporated by reference. Also incorporated by reference is the complete disclosure of the inventors own work: S. Hall et al., "Development of an Autonomous Bird Predation Reduction Device," An ASAE Meeting Presentation, Paper No. 01-3131 (Presented Jul. 30-Aug. 1, 2001). In the event of an otherwise irreconcilable conflict, however, the present specification shall control.

What is claimed is:

1. A device for traversing a water body and for reducing the number of birds in the vicinity of the water body, said device comprising:
    (a) one or more floats having sufficient buoyancy to maintain a portion of said device above the surface of the water body;
    (b) an electrically-powered propulsion system adapted to transport said device across the surface of the water body, without the need for continuous monitoring or input from a human;
    (c) an electrically-powered collision prevention system to detect potential collisions before collisions occur, and to cause said propulsion system to alter the direction of transport of said device to avoid at least some detected potential collisions before collisions occur; all without the need for continuous monitoring or input from a human;
    (d) an electrically-powered navigation system adapted to cause said propulsion system to periodically transport the device within the characteristic distance of at least 75% of the surface of the water body at least once every two hours; and
    (e) a power source to supply electrical power, directly or indirectly, to said propulsion system, to said collision prevention system, and to said navigation system;
whereby:
    (f) the transport of the device on the water body causes a reduction in the number of birds in the vicinity of the water body as compared to the number of birds that would be present in the absence of the transport of the device.

2. A device as recited in claim 1, wherein said device is adapted to operate in an active and a passive mode; wherein in the active mode, said device autonomously traverses a surveyed area of the water body either continuously or upon detection of at least one bird; and wherein in the passive mode, said device traverses the water body without regard to the location of any birds.

3. A device as recited in claim 1, wherein when said collision prevention system detects a potential collision said device is adapted to stop, back up, rotate between 0° and 360°, and then proceed forward, while operating either in a passive or active mode.

4. A device as recited in claim 1, wherein said propulsion system comprises a drive source and a motive source; wherein said drive source comprises at least two paddle wheels; and wherein said motive source comprises at least one electric motor to activate each paddle wheel.

5. A device as recited in claim 4, wherein said motive source operate said paddle wheels independently to propel and steer said device.

6. A device as recited in claim 1, wherein said collision prevention system comprises proximity feelers pivotally mounted on said device and attached to a triggering mechanism.

7. A device as recited in claim 6, wherein said triggering mechanism comprises a magnetic switch.

8. A device as recited in claim 1, wherein said navigation system is capable of identifying birds and guiding said device in the direction of said birds.

9. A device as recited in claim 1, wherein said power source comprises solar panels.

10. A device as recited in claim 9, wherein said power source additionally comprises one or more batteries adapted to store energy from said solar panels.

11. A device as recited in claim 1, wherein said electrically-powered navigation system is adapted to cause the propulsion system to periodically transport the device within the characteristic distance of 90% of the surface of the water body at least once every thirty minutes.

12. A collection comprising a plurality of devices for traversing a water body and for reducing the number of birds in the vicinity of the water body, said device comprising:
(a) one or more floats having sufficient buoyancy to maintain a portion of said devices above the surface of the water body;
(b) an electrically-powered propulsion system adapted to transport said devices across the surface of the water body, without the need for continuous monitoring or input from a human;
(c) an electrically-powered collision prevention system to detect potential collisions before collisions occur, and to cause said propulsion system to alter the direction of transport of said devices to avoid at least some detected potential collisions before collisions occur; all without the need for continuous monitoring or input from a human;
(d) an electrically powered navigation system adapted to cause the propulsion system to transport said devices across the water body, wherein at least one of said devices in said collection is periodically transported within the characteristic distance of at least 75% of the surface of the water body at least once every two hours; and
(e) a power source to supply electrical power, directly or indirectly, to said propulsion system, to said collision prevention system, and to said navigation system;
whereby:
(f) the transport of said devices on the water body causes a reduction in the number of birds in the vicinity of the water body as compared to the number of birds that would be present in the absence of the transport of said devices.

13. A collection as recited in claim 12, wherein said devices are adapted to operate in an active and a passive mode; wherein in the active mode, said devices autonomously traverse a surveyed area of the water body either continuously or upon detection of at least one bird; and wherein in the passive mode, said devices traverse the water body without regard to the location of any birds.

14. A collection as recited in claim 12, wherein when said collision prevention system detects a potential collision said devices are adapted to stop, back up, rotate between 0° and 360°, and then proceed forward, while operating either in a passive or active mode.

15. A collection as recited in claim 12, wherein said propulsion system comprises a drive source and a motive source; wherein said drive source comprises at least two paddle wheels; and wherein said motive source comprises at least one electric motor to activate each paddle wheel.

16. A collection as recited in claim 15, wherein said motive source operate said paddle wheels independently to propel and steer said devices.

17. A collection as recited in claim 12, wherein said collision prevention system comprises proximity feelers pivotally mounted on said devices and attached to a triggering mechanism.

18. A collection as recited in claim 17, wherein said triggering mechanism comprises a magnetic switch.

19. A collection as recited in claim 12, wherein said navigation system is capable of identifying birds and guiding said devices in the direction of said birds.

20. A collection as recited in claim 12, wherein said power source comprises solar panels.

21. A collection as recited in claim 20, wherein said power source additionally comprises one or more batteries adapted to store energy from said solar panels.

22. A collection as recited in claim 12, wherein said electrically-powered navigation system is adapted to cause the propulsion system to periodically transport said devices within the characteristic distance of 90% of the surface of the water body at least once every thirty minutes.

23. A device for traversing a surveyed area and for reducing the number of birds in the vicinity of the surveyed area, said device comprising:
(a) one or more floats having sufficient buoyancy to maintain a portion of said device above the surface of a water body when operating the device in water;
(b) an electrically-powered propulsion system adapted to transport said device across the surface of the surveyed area, without the need for continuous monitoring or input from a human;
(c) an electrically-powered collision prevention system to detect potential collisions before collisions occur, and to cause said propulsion system to alter the direction of transport of said device to avoid at least some detected potential collisions before collisions occur; all without the need for continuous monitoring or input from a human;
(d) an electrically-powered navigation system adapted to cause the propulsion system to periodically transport the device within the characteristic distance of at least 75% of the surface of the surveyed area at least once every two hours; and
(e) a power source to supply electrical power, directly or indirectly, to said propulsion system, to said collision prevention system, and to said navigation system;
whereby:
(f) the transport of the device on the surface of the surveyed area causes a reduction in the number of birds in the vicinity of the surveyed area as compared to the number of birds that would be present in the absence of the transport of the device.

24. A device as recited in claim 23, wherein said device is adapted to operate in an active and a passive mode; wherein in the active mode, said device autonomously traverses a surveyed area either continuously or upon detection of at least one bird; and wherein in the passive mode, said device traverses the surveyed area without regard to the location of any birds.

25. A device as recited in claim 23, wherein when said collision prevention system detects a potential collision said device is adapted to stop, back up, rotate between 0° and 360°, and then proceed forward, while operating either a passive or active mode.

26. A device as recited in claim 23, wherein said propulsion system comprises a drive source and a motive source; wherein said drive source comprises at least two paddle wheels; and wherein said motive source comprises at least one electric motor to activate each paddle wheel.

27. A device as recited in claim 26, wherein said motive source operate said paddle wheels independently to propel and steer said device.

28. A device as recited in claim 23, wherein said collision prevention system comprises proximity feelers pivotally mounted on said device and attached to a triggering mechanism.

29. A device as recited in claim 28, wherein said triggering mechanism comprises a magnetic switch.

30. A device as recited in claim 23, wherein said navigation system is capable of identifying birds and guiding said device in the direction of said birds.

31. A device as recited in claim 23, wherein said power source comprises solar panels.

32. A device as recited in claim 23, wherein said power source is a docking station adapted to recharge said device.

33. A device as recited in claim 31, wherein said power source additionally comprises one or more batteries adapted to store energy.

34. A device as recited in claim 32, wherein said power source additionally comprises one or more batteries adapted to store energy.

35. A device as recited in claim 23, wherein said electrically-powered navigation system is adapted to cause the propulsion system to periodically transport the device within the characteristic distance of 90% of the surface of the surveyed area at least once every thirty minutes.

* * * * *